June 30, 1931.  H. B. PRATT  1,812,370
SUBMARINE MINE
Filed Oct. 29, 1928    4 Sheets-Sheet 1
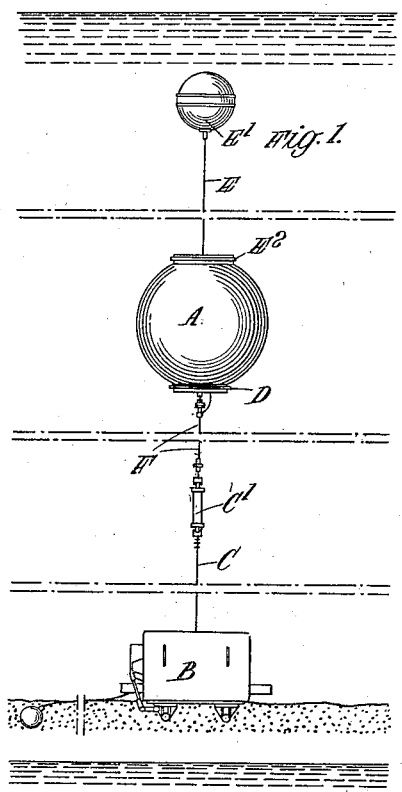
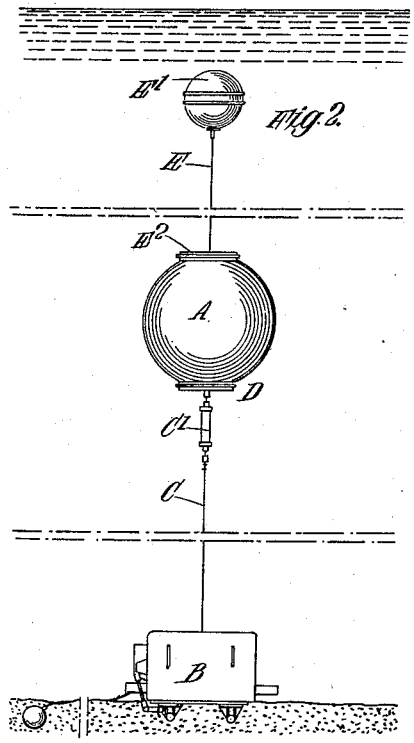
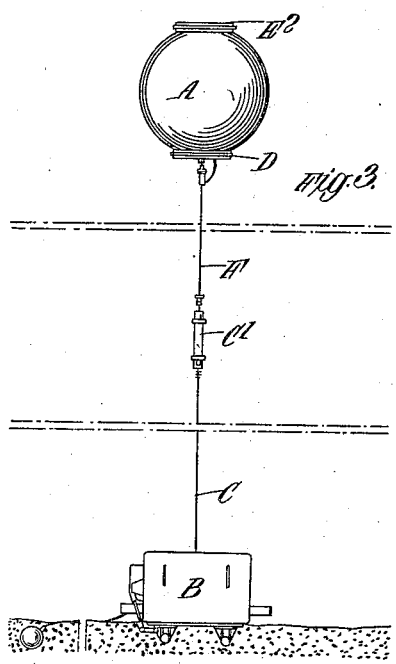
Inventor
Hartley Blyth Pratt
By Pennie Davis Marvin and Edmonds
attorneys

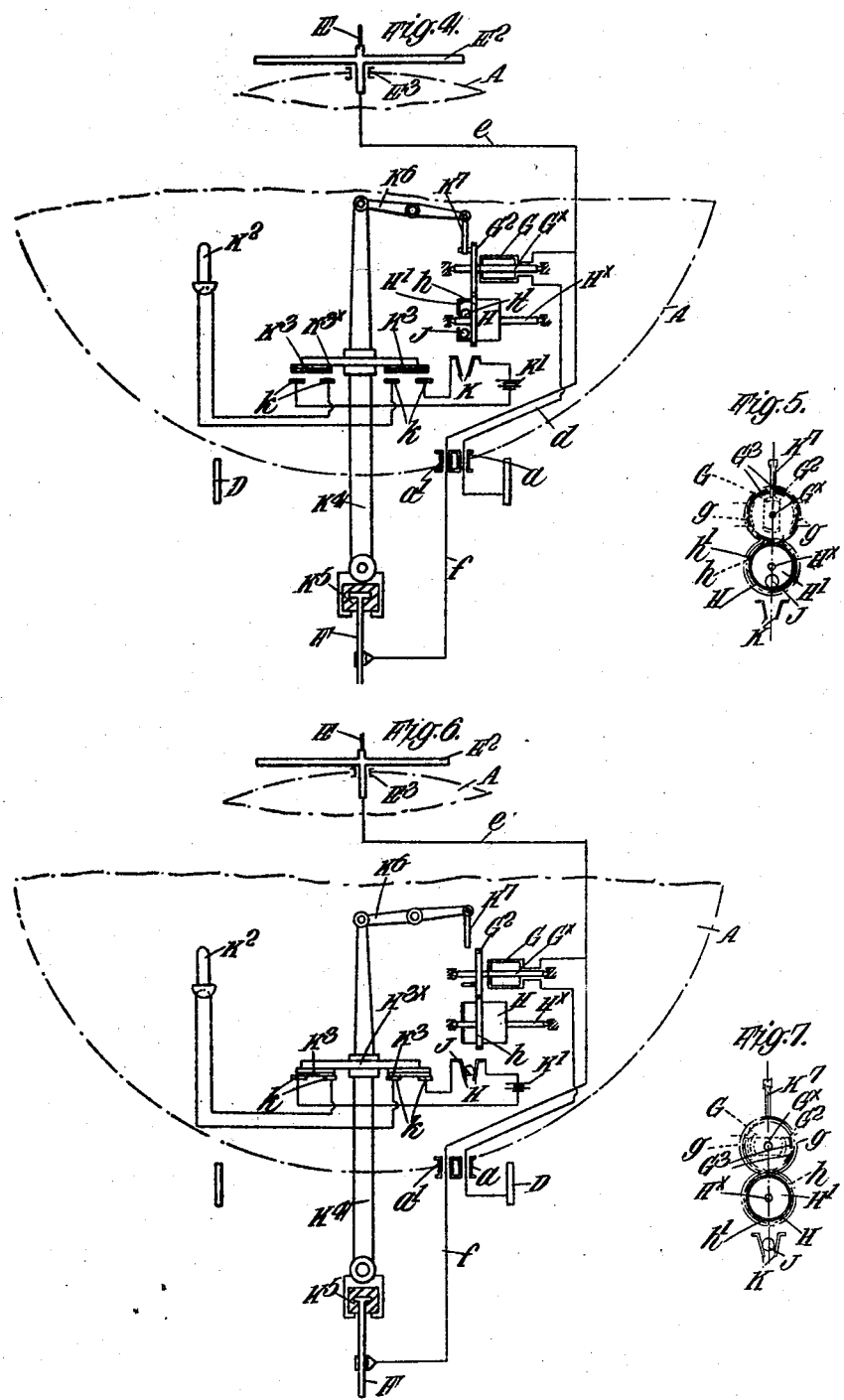

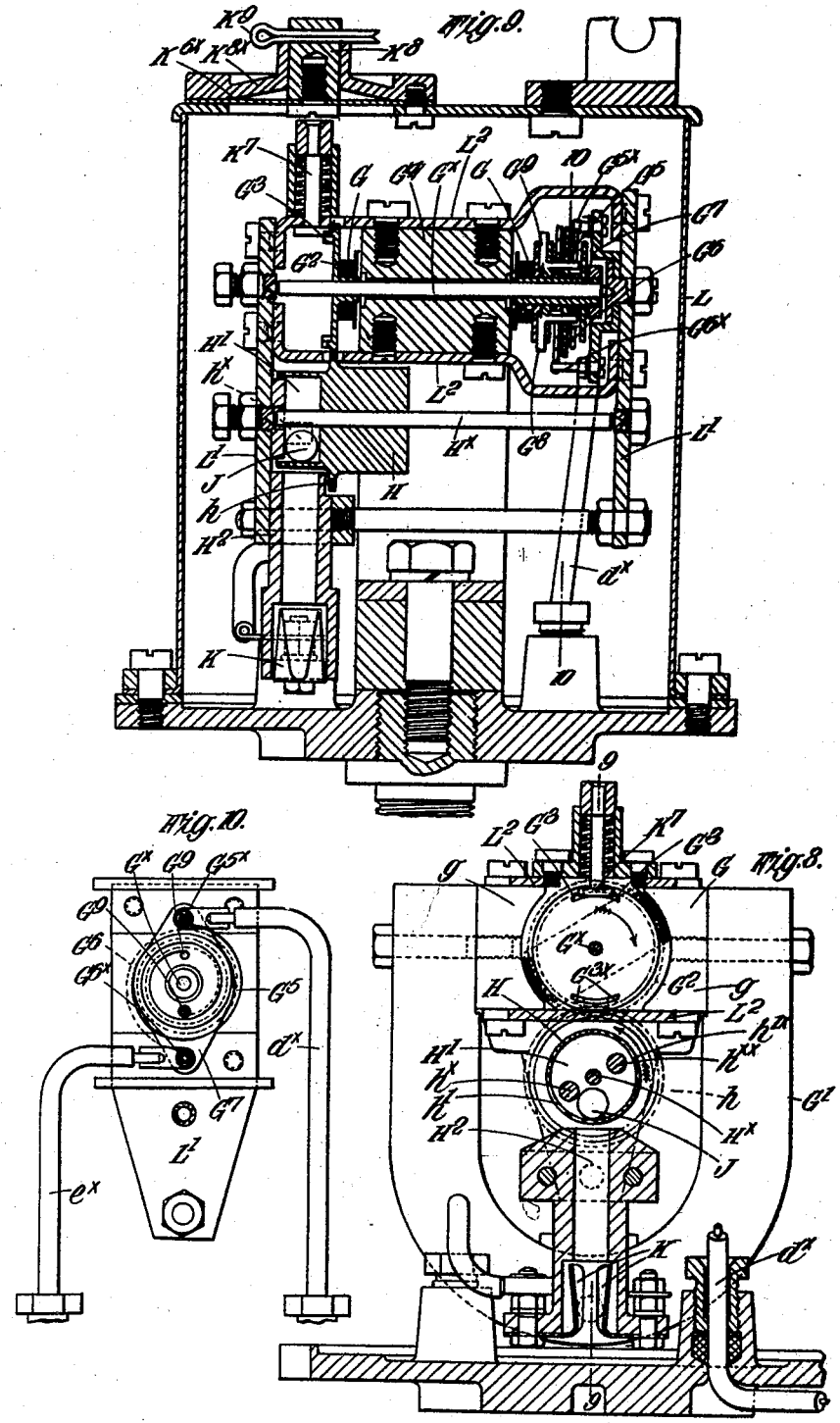

June 30, 1931.  H. B. PRATT  1,812,370
SUBMARINE MINE
Filed Oct. 29, 1928   4 Sheets-Sheet 4
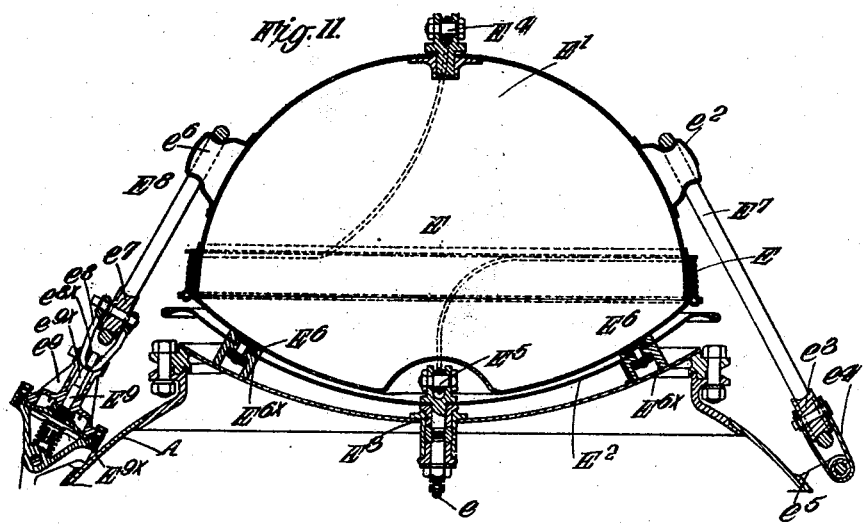
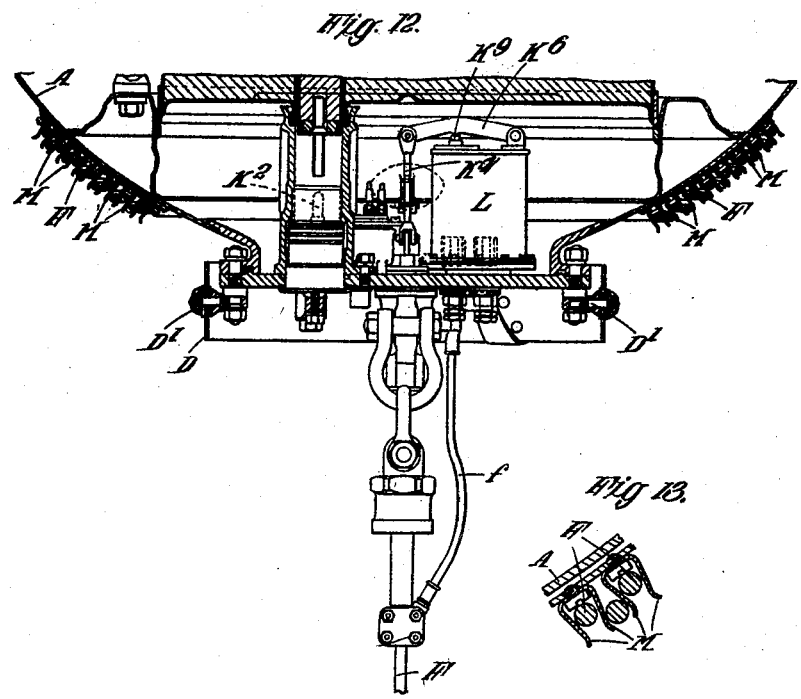
Inventor
Hartley Blyth Pratt
By Pennie Davis Marvin & Edmonds
attorneys Patented June 30, 1931

1,812,370

UNITED STATES PATENT OFFICE

HARTLEY BLYTH PRATT, OF BARROW-IN-FURNESS, ENGLAND, ASSIGNOR TO VICKERS-ARMSTRONG LIMITED, OF WESTMINSTER, ENGLAND, A BRITISH COMPANY

SUBMARINE MINE

Application filed October 29, 1928, Serial No. 315,637, and in Great Britain October 12, 1928.

This invention relates to submarine mines of the kind provided with two electrical conductors, (one of which is herein termed the "electrode" and the other the "antenna"), which are submerged in the sea and which form part of an electrical circuit through which a current flows, when a metal vessel (e. g. a submarine) makes contact with one or the other of these conductors, in order to explode the mine, the said vessel and the particular conductor which is not in contact therewith constituting an electric couple or cell with the sea-water acting as the electrolyte. In such mines it has been proposed to provide a moving coil in the circuit containing the electrode and the antenna (this circuit being herein termed the "primary circuit") which moving coil forms the primary element of a relay and serves when angularly displaced by the passage of a current therethrough to release a weight or ball which then bridges two contact members in the firing circuit of the mine and thereby completes this circuit to cause the mine to explode. It has been found that this moving coil is liable to give rise to premature explosion of the mine as the said coil tends to remain rotationally stationary in space owing to its inertia (i. e. there is relative rotary movement between the coil and the mine) when the mine is subjected to shocks in the sea, in which case the ball may be released to complete the firing circuit just as though the coil had been displaced by the passage of an electric current through it.

According to the present invention, in order to avoid the above disadvantage, the inertia effect of the coil is counteracted by means of a rotary balance member which is geared to the moving coil so that these parts move in opposite directions and said rotary balance member is so constructed that its rotary moment of inertia is equal to that of the moving coil, the result being that any rotary impulse with respect to the mine exerted on the coil due to shock imparted to the mine is exactly balanced by the reaction of an equal rotary impulse given to the rotary balance member with respect to the mine. The said rotary balance member may carry, and serve to release, the aforesaid ball, and the movement of this ball within a compartment in the said member may be limited by means of stationary pins projecting into the said compartment.

Prior to and during the laying of the mine, the moving coil may be prevented from moving angularly by means of a locking member which is displaced to its unlocking position by the pull on the mooring cable of the mine after the latter has been correctly moored. A safety switch in the firing circuit may also be moved to its closed position by the pull on the said mooring cable.

The aforesaid antenna may be coiled on a float which is supported and held on the mine in such a manner that it is electrically insulated from the mine casing and this float may be released from the mine by a hydrostatic release device when the mine (with the float attached thereto) has descended to a predetermined depth below the surface of the sea.

In addition to, or instead of, the antenna extending upwardly from the mine to the float, a flexible antenna may be provided below the mine, this latter or lower antenna forming part of the mooring connection between the mine and the sinker or anchor. This lower antenna is formed of a cable of copper, or copper alloy, or other material suitable for the purpose, of such a strength as to be suitable for mooring the mine, and has insulating end connections which electrically insulate the antenna from its attachment to the mine above and to the steel mooring cable below. The said lower antenna is electrically connected to the moving coil by a separate insulated conductor leading from the antenna.

The lower antenna is initially (i. e. before the mine is laid) coiled in spring clips on the underside of the mine casing, from which it is pulled off by the sinker or anchor when it is released from the mine after laying. Unless the lower antenna is completely pulled off, and the mine is properly moored, the tension in the mooring cable cannot effect the closing of the safety switch in the firing circuit and the mine remains inoperative.

In order that the said invention may be clearly understood and readily carried into effect, the same will now be described more fully with reference to the accompanying drawings in which:—

Figure 1 is a diagram illustrating a moored submarine mine provided with an upper antenna and a lower antenna, Figure 2 is a diagram similar to Figure 1 showing a mine provided with an upper antenna only, Figure 3 is a diagram similar to Figures 1 and 2 showing a mine provided with a lower antenna only, Figure 4 is a view showing diagrammatically the primary circuit, the firing circuit and their associated parts in the position they occupy before the mine is moored, Figure 5 is a diagrammatic end view of the relay of Figure 4, Figure 6 is a view similar to Figure 4 but showing the parts in the position they occupy after the mine has been moored and the relay has been brought into operation, Figure 7 is a diagrammatic end view of the relay of Figure 6, Figure 8 is a sectional end elevation showing a constructional form of the moving coil, the rotary balance member and their associated parts, Figure 9 is a section taken approximately on the line 9, 9 of Figure 8 with the casing removed, Figure 10 is a local section taken approximately on the line 10, 10 of Figure 9, Figure 11 is a section showing a constructional form of the float and its associated parts, Figure 12 is a section of the lower part of the mine showing how the lower antenna is held thereon prior to mooring, and Figure 13 is an enlarged view of part of Figure 12.

A is a mine casing, B is the sinker or anchor, C is the mooring cable having a shock absorbing device $C^1$, D is the electrode, E is the upper antenna which is supported by a metal float $E^1$ and is electrically connected to a guard plate $E^2$ arranged at the upper part of the mine casing and electrically insulated therefrom by means of an insulating bush $E^3$, and F is the lower antenna, the said antennæ being preferably made of copper or copper alloy. The function of the guard plate $E^2$ is to provide a path, through the water from the antenna to the mine, for stray earth currents, this path being of less resistance than that through the relay, thus preventing operation of the relay by such earth currents.

The electrode D, which is in the form of a plate or ring, is electrically connected to a wire $d$ which passes through an insulating bush $a$ (Figures 4 and 6) in the lower part of the mine casing and is connected to one end of a moving coil G arranged between the pole pieces $g^1$, $g^1$ of a permanent magnet $G^1$ (Figures 8 and 9) and connected to a spindle $G^x$. The upper antenna E and the guard plate $E^2$ are electrically connected to a wire $e$ which is insulated from the mine casing and is connected to the other end of the moving coil, and the lower antenna F is electrically connected to a wire $f$ which passes through an insulating bush $a^1$ in the lower part of the mine casing and is connected to the wire $e$ and therefore to the second-mentioned end of the moving coil. The said parts constitute the primary circuit through which current flows when a metal vessel (e. g. a submarine) comes into contact with one of the antennæ or with the float $E^1$. The spindle $G^x$ of the moving coil G carries a pinion $G^2$ meshing with a pinion $h$ of equal size on the spindle $H^x$ of a rotary balance member H carrying in a compartment $H^1$ therein a ball J which, when the said balance member is angularly displaced by the moving coil, falls through a hole $h^1$ in the peripheral wall of the said compartment and bridges two contacts K, K arranged in the firing circuit which contains a battery $K^1$, a fusible wire or other igniting device for the detonator $K^2$ and contacts $k$, $k$—for the two contact pieces $K^3$, $K^3$ of a safety switch. These contact pieces are carried by (but insulated from) a plate $K^{3x}$ connected to a member $K^4$ which is attached through the intermediary of an insulating block $K^5$ to the upper end of the lower antenna F or which, when the said lower antenna is not provided, is attached in any suitable manner to the upper end of the shock absorber $C^1$ of the mooring cable C. The said member $K^4$ is also connected by means of a lever $K^6$ with a stop member $K^7$ which normally engages between lateral projections $G^3$, $G^3$ on the aforesaid pinion $G^2$ to hold the moving coil G in the position shown by Figure 5. The said member $K^4$ is held in the position shown by Figure 4 (in which the safety switch contact pieces $K^3$, $K^3$ occupy the broken position and the stop member $K^7$ prevents the coil G from moving) by means of a soluble salt plug as is well understood, until the mine has been moored. When this soluble plug has become dissolved by the action of the sea-water the buoyancy of the mine A causes it to move upwards to bring the parts into the position shown by Figure 6 in which the safety switch contact pieces $K^3$, $K^3$ bridge the contacts $k$—and the stop member $K^7$ releases the moving coil; the latter is then free to move as a result of the flow of current through it and when this happens the ball J falls through the hole $h^1$ and bridges the contacts K, K to complete the firing circuit and explode the mine.

A constructional form of the moving coil G, the balance member H and their associated parts will now be described with reference to Figures 8, 9 and 10. The parts constituting the relay are arranged within a water-tight casing L and the spindles $G^x$ and $H^x$ to which the moving coil and the balance member respectively are connected are carried by end plates $L^1$, $L^1$ supported by horizontal plates $L^2$, $L^2$ which are connected to the pole pieces $g$, $g$ and which in turn support a soft iron core piece $G^4$ (Figure 9) appertaining to the magnet $G^1$. The rotational movement of the coil G is resisted by two spiral springs $G^5$, $G^6$ which may be oppositely arranged so that their clearances with adjacent parts tend to increase as the coil rotates. The outer end of the spring $G^5$ is connected to a metal pin $G^{5x}$ carried by an insulating member $G^7$ and the outer end of the spring $G^6$ is connected to a metal pin $G^{6x}$ also carried by the said insulating member $G^7$. The inner end of the spiral spring $G^5$ is attached to a metal wire $G^8$ which is electrically connected to one end of the winding of the moving coil G and the inner end of the other spiral spring $G^6$ is attached to a metal wire $G^9$ which is electrically connected to the other end of the winding of the moving coil. The said metal wires $G^8$ and $G^9$ serve also as mechanically driving pieces for the inner ends of the springs of the moving coil spindle $G^x$ for which purpose they are carried by insulating washers suitably connected to the said spindle. One of the aforesaid pins $G^{5x}$, $G^{6x}$ is electrically connected to a wire $d^x$ leading to the aforesaid wire $d$ appertaining to the electrode D and the other pin is electrically connected to a wire $e^x$ leading to the aforesaid wires $e$, $f$ appertaining to the upper and lower antennæ E, F. The said springs thus serve as electrical connections to the moving coil.

The aforesaid ball J has its motion in the compartment $H^1$ of the rotary balance member H limited by means of fixed pins $h^x$, $h^{xx}$ carried by one of the end plates $L^1$ so that the ball can pass through the hole $h^1$ only when the rotary balance member has been angularly displaced the appropriate amount. When the said ball is released it falls through a guide $H^2$ and comes to rest between the aforesaid contacts K, K which are in the form of spring fingers as will be seen from Figure 8. Opposite the aforesaid projections $G^3$, $G^3$ on the moving coil G there are similar projections $G^{3x}$, $G^{3x}$ (Figure 8) for the purpose of balancing the said coil, and opposite the hole $h^1$ in the aforesaid compartment $H^1$ of the rotary member H there is formed a similar hole $h^{1x}$ (Figure 8) for the purpose of balancing the said rotary member. The aforesaid pin $h^{xx}$ prevents the ball J from jumping through the hole $h^{1x}$ or passing round into an inoperative position on top of the other pin $h^x$. The stop member $K^7$ is in the form of a spring plunger with its upper end arranged contiguous to a member $K^8$ slidably carried by a plate $K^{8x}$ at the upper end of the casing L and provided with a rubber diaphragm $K^{6x}$ to make the said member water-tight. This member $K^8$ is depressed by the aforesaid lever $K^6$ or its equivalent and prior to the placing of the casing L and its parts within the mine is held in the inoperative position shown by Figure 9 by means of a split pin $K^9$ which must be removed before the said casing is placed in the mine.

The moving coil G and all the other parts rotating with the spindle $G^x$ are carefully balanced and the weight of the rotary balance member H is made such that the rotary moment of intertia of the mass represented by the spindle $H^x$ and the parts rotating with it is made as exactly as possible the same as the rotary moment of inertia of the mass represented by the spindle $G^x$ and the parts rotating with it. As these two masses are constrained (by means of the pinions $G^2$, $h$) to rotate in opposite directions, it is clear that the tendency, due to any rotary shock applied to the mine, for there to be relative angular movement in one direction between one of the masses and the mine is exactly balanced and counteracted by the tendency of there being relative angular movement in the same direction between the other mass and the mine with the result that such shock will not effect the release of the ball J.

The aforesaid upper antenna E is coiled on the periphery of the float $E^1$ as shown in Figure 11. One end of this antenna is connected to a shackle $E^4$ attached to the part of the float which is uppermost when it is in position on the top of the mine and the other end is attached to a shackle $E^5$ having a stem which passes through the aforesaid insulating bush $E^3$ and by which the shackle is attached to the mine casing as shown. The float $E^1$ is preferably made of copper and rests against rubber pads $E^6$, $E^6$ which are connected to the aforesaid guard plate, the latter also having on its under side further rubber pads $E^{6x}$, $E^{6x}$ bearing against the upper part of the mine casing.

The aforesaid shackle E⁵ and its stem together with the nut on the lower end of the latter serve to hold the guard plate in position on the mine casing. It will thus be seen that the guard plate is completely insulated from the mine casing and that the float is in turn insulated from the guard plate. The float is held in position on the guard plate by two links E⁷, E⁸ made of rubber. The link E⁷ passes around a projection e² at one side of the float and round a block e³ carried by a link e⁴ connected to a bracket e⁵ on the mine casing. The other rubber link E⁸ passes around a projection e⁶ on the other side of the float and around a block e⁷ carried by a shackle e⁸ which engages with one arm e⁸ˣ of a bell crank lever which is pivoted to a casing e⁹ and the other arm e⁹ˣ of which lies behind a rod E⁹ connected to a spring controlled diaphragm E⁹ˣ the outer surface of which is open to the sea-water. The device just described constitutes a hydrostatic release device in that when the pressure of the sea-water on the diaphragm E⁹ˣ overcomes the resistance of the spring operating on this diaphragm, together with the resistance of the diaphragm itself, the rod E⁹ moves away from the arm e⁹ˣ of the aforesaid bell crank lever thereby allowing the latter to become angularly displaced by the pull of the rubber link E⁸ upon the arm e⁸ˣ of the bell crank lever and in this manner the shackle e⁸ becomes released from the arm e⁸ˣ and the rubber link E⁸ no longer holds the float in position. As the float is thus released at one side it will become separated from the mine and will rise in the water during which time the antenna E becomes uncoiled from its periphery. If the hydrostatic release device should fail to operate, the float remains in place at the top of the mine after the latter has been moored, but the float and the upper antenna remain effectively insulated from the mine casing.

Referring to Figures 12 and 13, the lower antenna F is coiled spirally on the underside of the mine casing and is held in position by spring clips M which are arranged in such a manner that one convolution of the antenna is disposed between the two sides of each spring clip whilst the next convolution is held between one of the sides of this spring clip and the contiguous side of the next spring clip as will be seen readily from Figure 13. The antenna is shown in Figure 12 as being in position in the spring clips and also extending downwardly from the mine, but it will, of course, be understood that the latter position is assumed only after the antenna has been completely pulled off from the spring clips and the mine properly moored. As the closing of the aforesaid safety switch and the release of the aforesaid moving coil are dependent upon the pull in the mooring cable it will be clear that unless the antenna F is completely pulled off the spring clips the safety switch will not be closed and the moving coil will not be released.

Figure 12 also shows the electrode D in the form of a ring or annular plate connected to part of the mine casing by studs or bolts D¹, D¹ which serve to retain the said electrode ring or plate away from any part of the mine casing and which are insulated from the said electrode ring or plate by means of insulating washers.

What I claim and desire to secure by Letters Patent of the United States is:—

1. A submarine mine of the kind set forth, wherein the circuit containing the electrode and the antenna has a moving coil which is geared to a rotary balance member so that these parts move in opposite directions, the balance member being so constructed that its rotary moment of inertia is equal to that of the moving coil with the result that any rotary impulse with respect to the mine exerted on the coil due to shock imparted to the mine is exactly balanced by the reaction of an equal rotary impulse given to the rotary balance member with respect to the mine.

2. A submarine mine as in claim 1, wherein the rotary balance member carries, and serves to release, a ball or weight which operates to complete the firing circuit of the mine.

3. In a submarine mine, the combination with the elements claimed in claim 1, of a ball which operates to complete the firing circuit of the mine, a compartment in the rotary balance member for the reception of said ball, and stationary pins projecting into said compartment for limiting the movement of the ball within this compartment.

4. A submarine mine of the kind set forth, comprising a moving coil in the circuit containing the electrode and the antenna, a movable member within the mine, means for effecting a displacement of said member by a pull on the mooring cable of the mine after the latter has been correctly moored, means whereby the said displacement of said member unlocks the moving coil, a safety switch in the firing circuit of the mine, and means whereby the said displacement of said member also moves said switch to its closed position.

5. A submarine mine of the class described, comprising a metal float having antennæ thereon, insulating means for holding said float on the mine casing and a hydrostatic device operating to release the metal float from the mine when the latter with the float attached thereto has descended to a predetermined depth below the surface of the sea.

6. In a submarine mine, the combination with the elements claimed in claim 5, of spring clips on the lower part of the mine casing for resiliently holding the antenna in coiled formation on the said lower part of the mine.

7. In a submarine mine the combination with the elements claimed in claim 5, of an insulated conductor leading from the antenna and electrically connected to the primary circuit within the mine, and spring clips on the lower part of the mine casing for resiliently holding the antenna in coiled formation on the said lower part of the mine.

H. B. PRATT.